US008923377B2

(12) United States Patent
Miao

(10) Patent No.: US 8,923,377 B2
(45) Date of Patent: Dec. 30, 2014

(54) METHODS AND DEVICES FOR RECEIPT OF IMBALANCED TRANSMISSION SIGNAL

(75) Inventor: Honglei Miao, Espoo (FI)

(73) Assignee: Nokia Corporation, Espoo (FI)

(*) Notice: Subject to any disclaimer, the term of this patent is extended or adjusted under 35 U.S.C. 154(b) by 247 days.

(21) Appl. No.: 13/106,937

(22) Filed: May 13, 2011

(65) Prior Publication Data

US 2012/0288032 A1 Nov. 15, 2012

(51) Int. Cl.
*H03H 7/40* (2006.01)
*H04L 25/02* (2006.01)
*H04L 25/03* (2006.01)

(52) U.S. Cl.
CPC ........ *H04L 25/0242* (2013.01); *H04L 25/0204* (2013.01); *H04L 25/03891* (2013.01); *H04L 2025/03426* (2013.01)
USPC .......................................... 375/229; 375/316

(58) Field of Classification Search
CPC ............ H04L 27/2647; H04L 25/4925; H04L 1/0618; H04L 1/06; H04L 5/0007; H04B 3/32
USPC .......................................... 375/260, 285, 267
See application file for complete search history.

(56) References Cited

U.S. PATENT DOCUMENTS

| 8,737,339 | B2* | 5/2014 | Miao et al. .................... 370/329 |
| 2006/0109891 | A1 | 5/2006 | Guo et al. |
| 2006/0146953 | A1* | 7/2006 | Raghothaman et al. ...... 375/267 |
| 2006/0159160 | A1 | 7/2006 | Kim et al. |
| 2008/0075208 | A1* | 3/2008 | Li et al. .......................... 375/347 |
| 2008/0238775 | A1* | 10/2008 | Guo et al. ..................... 342/377 |
| 2009/0213909 | A1* | 8/2009 | Grant et al. ................... 375/148 |
| 2009/0213944 | A1* | 8/2009 | Grant ............................ 375/260 |
| 2010/0210221 | A1* | 8/2010 | Takano et al. .................. 455/68 |
| 2011/0105051 | A1* | 5/2011 | Thomas et al. ................. 455/69 |

FOREIGN PATENT DOCUMENTS

CN 101091366 A 12/2007
CN 101310450 A 11/2008

OTHER PUBLICATIONS

Extended European Search Report dated Mar. 27, 2014, issued in corresponding EP Application No. 12166381.9, 9 pages.
QUALCOMM Incorporated, "CQI reporting for MIMO UE's when the P-CPICH and S-CPICH have unequal power settings", 3GPP TSG RAN WG1 Meeting #61bis, R1-103847, Dresden, Germany, Jun. 28-Jul. 2, 2010, Agenda item: 5.1.1, 10 pages.

(Continued)

*Primary Examiner* — Sam K Ahn
*Assistant Examiner* — Janice Tieu
(74) *Attorney, Agent, or Firm* — Squire Patton Boggs (US) LLP

(57) ABSTRACT

Communication systems may benefit from an HSPA MIMO receiver configured for receipt of an imbalanced transmit signal, as well as a method for operating the receiver. According to certain embodiments, a method can include receiving a multiple-input multiple-output system communication signal comprising at least one primary signal at a first power level from a first antenna and a secondary signal at a second power level different from the first power level from a second antenna. The method can also include estimating at least one parameter of the communication signal. The method can further include applying the at least one parameter as estimated to calculate linear minimum mean square error coefficients. The method can additionally include applying the linear minimum mean square error coefficients to process the communication signal.

13 Claims, 3 Drawing Sheets

(56) References Cited

OTHER PUBLICATIONS

Lenardi, Massimiliano et al., "A RAKE Structured SINR Maximizing Mobile Receiver for the WCDMA Downlink", XP032139740, vol. 1, Nov. 4, 2001, DOI: 10.1109/ACSSC.2001.98690, ISBN: 978-0/7803-7147-7, pp. 410-414.

Buchacher, Clemens et al., "A Semi-Blind Base Station Power Estimation Algorithm for Interference Aware HSDPA Receivers", 18th European Signal Processing Conference (EUSIPCO-2010), Aalborg, Denmark, Aug. 23-27, 2010, EURASIP, 2010, XP55106956, pp. 1592-1596.

\* cited by examiner

METHODS AND DEVICES FOR RECEIPT OF IMBALANCED TRANSMISSION SIGNAL

BACKGROUND

1. Field

Communication systems, such as third generation partnership project (3GPP) high speed packet access plus (HSPA+), multiple-input multiple-output (MIMO), imbalanced transmission, and advanced receivers thereof may benefit from an HSPA MIMO receiver configured for receipt of an imbalanced transmit signal. A communications device or modem chip can incorporate such a configuration.

2. Description of the Related Art

A conventional linear minimum mean square error (LMMSE)-based chip equalizer may assume that two transmit antennas have equal transmit power. As such, scaling factors may not be used. Additionally, an ad hoc solution may be used for the diagonal loading factor instead of an accurate noise variance estimate $\sigma_{n_i}^2$. Mathematically, the conventional solution can be expressed as follows:

$$\tilde{w}_{LMMSE,1} = (\hat{H}_1 \hat{H}_1^H + \hat{H}_2 \hat{H}_2^H + KI_{2F})^{-1} \hat{H}_1 \delta_D,$$

$$\tilde{w}_{LMMSE,2} = (\hat{H}_1 \hat{H}_1^H + \hat{H}_2 \hat{H}_2^H + KI_{2F})^{-1} \hat{H}_2 \delta_D$$

where $\tilde{w}_{LMMSE,i}$, i=1,2 are the LMMSE equalizer filter coefficients, $\hat{H}_i$, i=1,2 are the channel matrixes constructed from the channel impulse response estimates, with the structure defined in equations (2.1) and (2.2), K is the diagonal loading factor, $$\delta_D \in R^{\frac{F+L}{2}-1}$$

stands for the unit vector whose D+1 th element is 1, and other elements are all zeros, and R stands for real value.

SUMMARY

According to certain embodiments, a method includes receiving a multiple-input multiple-output system communication signal comprising at least one primary signal at a first power level from a first antenna and a secondary signal at a second power level different from the first power level from a second antenna. The method also includes estimating at least one parameter of the communication signal. The method further includes applying the at least one parameter as estimated to calculate linear minimum mean square error coefficients. The method additionally includes applying the linear minimum mean square error coefficients to process the communication signal.

An apparatus according to certain embodiments includes at least one processor and at least one memory including computer program instructions. The at least one memory and computer program instructions are configured to, with the at least one processor, cause the apparatus at least to estimate at least one parameter of a received multiple-input multiple-output system communication signal comprising at least one primary signal at a first power level from a first antenna and a secondary signal at a second power level different from the first power level from a second antenna. The at least one memory and computer program instructions are also configured to, with the at least one processor, cause the apparatus at least to apply the at least one parameter as estimated to calculate linear minimum mean square error coefficients. The at least one memory and computer program instructions are further configured to, with the at least one processor, cause the apparatus at least to apply the linear minimum mean square error coefficients to process the communication signal.

According to certain further embodiments, an apparatus includes receiving means for receiving a multiple-input multiple-output system communication signal comprising at least one primary signal at a first power level from a first antenna and a secondary signal at a second power level different from the first power level from a second antenna. The apparatus also includes estimating means for estimating at least one parameter of the communication signal. The apparatus further includes calculating means for applying the at least one parameter as estimated to calculate linear minimum mean square error coefficients. The apparatus additionally includes processing means for applying the linear minimum mean square error coefficients to process the communication signal.

A non-transitory computer readable medium is, in certain embodiments, encoded with instructions that, when executed in hardware, perform a process. The process includes receiving a multiple-input multiple-output system communication signal comprising at least one primary signal at a first power level from a first antenna and a secondary signal at a second power level different from the first power level from a second antenna. The process also includes estimating at least one parameter of the communication signal. The process further includes applying the at least one parameter as estimated to calculate linear minimum mean square error coefficients. The process additionally includes applying the linear minimum mean square error coefficients to process the communication signal.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
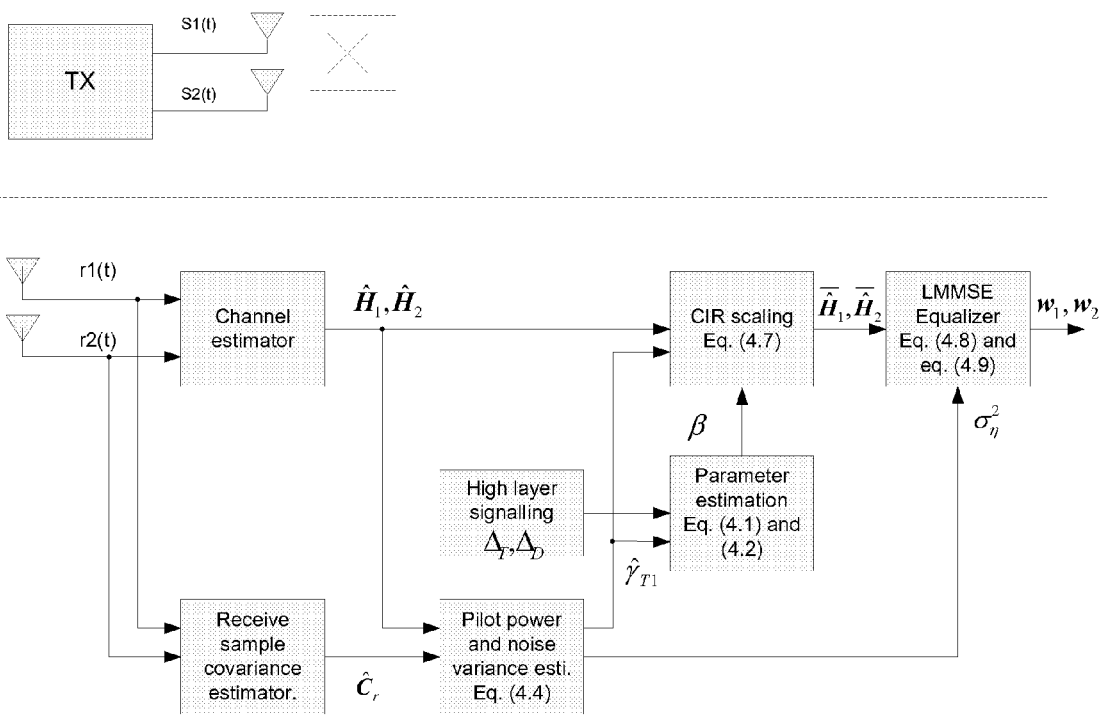
FIG. 1 illustrates a system according to certain embodiments of the present invention.

A multiple-input multiple-output communication system may employ at least two transmit antennas (a primary antenna and one or more secondary antennas), as well as multiple receive antennas. In communication systems that comply with protocols defined by the third generation partnership project (3GPP), the secondary common pilot channel (S-CPICH) can have lower power than the primary common pilot channel (P-CPICH). The secondary common pilot channel can be used as a reference signal to aid the channel estimation for the secondary transmission (tx) antenna. This approach may serve both non-multiple-input-multiple-output (non-MIMO) legacy high speed data packet access (HSDPA) users and multiple-input multiple-output users simultaneously. This approach may also alleviate performance degradation of the non-MIMO users due to space time transmit diversity (STTD).

While multiple-input multiple-output high speed data packet access channels can be transmitted at both antennas, all the other channels may only be transmitted at the primary transmit antenna, which may be referred to as the first antenna. The lower power of the secondary common pilot channel may reduce the interference, similar to inter-cell interference, to the legacy non-MIMO user equipment (UE). Such a method, however, may lead to imbalance of transmit signal power at two virtual transmit antenna ports.

The imbalanced transmission signal power may affect the performance of a conventional multiple-input multiple-output user equipment receiver that assumes balanced power at two transmit antennas.

In an example model, let F be defined as the length of the receiver equalizer filter operating at a sampling rate of two times chip rate, and let L be defined as the length of the channel impulse response (CIR) at the resolution of half chip. The method being described is not limited to a two-time chip rate. However, this mathematical example is for the two-time chip rate, which is used as an example implementation. The signal model of a two-by-two multiple-input multiple-output system with imbalanced transmission power can be defined as follows.

$$r[n] = H_1 s_1[n] + H_2 s_2[n] + \eta[n], \quad (2.1)$$

$$r[n] = \begin{pmatrix} r_1[n] \\ r_2[n] \end{pmatrix},$$

$$H_i = \begin{pmatrix} H_{1,i} \\ H_{2,i} \end{pmatrix}, i = 1, 2$$

$$\eta[n] = \begin{pmatrix} \eta_1[n] \\ \eta_2[n] \end{pmatrix},$$

where $$s_i[n] = \begin{pmatrix} s_i[n], s_i[n-1], \ldots \\ s_i\left[n - \frac{F+L}{2} + 2\right] \end{pmatrix}^T \in C^{\frac{F+L}{2}-1}, i = 1, 2$$

denotes the chip vector consisting of the n th and $$\frac{F+L}{2} - 2$$

onwards transmitted chips from i th transmit antenna, $r_j[n] = (r_j[2n+1], r_j[2n], \ldots r_j[2n-F+2])^T \in C^F$ defines the received signal vector of the j th receive branch consisting of successive F samples which depend on the n th and onwards transmitted chips, C stands for complex value, and $H_{j,i}$ defines the channel matrix with respect to the channel between i th transmit antenna and j th receive antenna. Using the baseband equivalent channel impulse response $h_{j,i} = (h_{j,i,0}, \ldots h_{j,i,L-1})^T \in C^L$, $H_{j,i}$ can be constructed as follows $$H_{j,i} = \begin{pmatrix} h_{j,i,1} & h_{j,i,3} & \ldots & h_{j,i,L-1} & 0 & \ldots & 0 & 0 & \ldots & \ldots & 0 \\ h_{j,i,0} & h_{j,i,2} & \ldots & h_{j,i,L-2} & 0 & \ldots & 0 & \ldots & \ldots & \ldots & 0 \\ 0 & h_{j,i,2} & h_{j,i,3} & \ldots & h_{j,i,L-1} & 0 & \vdots & \vdots & \ldots & 0 \\ 0 & h_{j,i,0} & h_{j,i,2} & \ldots & h_{j,i,L-2} & 0 & \vdots & 0 & \vdots & \ldots & 0 \\ \vdots & \ddots & \ddots & \ddots & \ddots & \ddots & \vdots & \vdots & \vdots & \ldots & 0 \\ 0 & \ldots & 0 & \ddots & \ddots & \ddots & \ddots & \ddots & \ldots & \ldots & 0 \\ 0 & \ldots & 0 & \ldots & & \ldots & 0 & h_{j,i,1} & h_{j,i,3} & \ldots & h_{j,i,L-1} \\ 0 & \ldots & 0 & \ldots & & \ldots & 0 & h_{j,i,0} & h_{j,i,2} & \ldots & h_{j,i,L-2} \end{pmatrix} \in C^{F \times (\frac{F+L}{2}-1)} \quad (2.2)$$

Additionally, $\eta_j[n] = (\eta_j[2n+1], \eta_j[2n], \ldots \eta_j[2n-F+2])^T \in C^F$ defines the noise signal vector in the received signal at the j th receive antenna and $\eta_j[n] \sim CN(0_F, \sigma_\eta^2 I_F)$. In practice, the noise variances on two branches can be different. For the sake of simplicity, however, this example focuses on a case in which two branches have same noise variance. However, modifications to address the case of two difference noise variances are also permitted. The transmitted chip vector $s_1[n]$ and $s_2[n]$ can be further expressed as follows:

$$s_1[n] = \sqrt{\gamma_{T,1}} s_{T,1}[n] + \sqrt{\gamma_D} s_{D,1}[n] + \sqrt{\gamma_O} s_O[n], \quad (2.3)$$

and $$s_2[n] = \sqrt{\gamma_{T,2}} s_{T,2}[n] + \sqrt{\gamma_D} s_{D,2}[n], \quad (2.4)$$

where $$s_{T,1}[n] = \left(s_{T,1}[n], s_{T,1}[n-1], \ldots s_{T,1}\left[n - \frac{F+L}{2} + 2\right]\right)^T \in C^{\frac{F+L}{2}-1}$$

defines the primary common pilot channel chip vector transmitted from the first transmit antenna with unit chip power, that is, $E(|s_{T,1}[n]|^2) = 1$. Similarly, $s_{T,2}[n]$ denotes the secondary common pilot channel chip vector of unit chip power transmitted from the second transmit antenna. Moreover, $s_{D,1}[n]$ stands for the combined high-speed downlink shared channel (HS-DSCH) chip vector of unit power transmitted from the i th transmit antenna and $s_O[n]$ denotes the combined other channel chip vector of unit power transmitted only from the first transmit antenna. Likewise, $\gamma_{T,1}$ denotes the primary common pilot channel power, $\gamma_{T,2}$ denotes the power of the secondary common pilot channel, $\gamma_D$ denotes the power of the combined high-speed downlink shared channels, and $\gamma_O$ denotes the power of combined other channels.

Without loss of generality, the total power transmitted from the first transmit antenna can be assumed to 1, and the total transmitted signal power from the second transmit antenna can be defined as p, that is $$\gamma_{T,1} + \gamma_D + \gamma_O = 1$$

$$p = \gamma_{T,2} + \gamma_D. \quad (2.5)$$

The power offset $\Delta_T$ between secondary common pilot channel and primary common pilot channel is signaled from the network to the user equipment, it means $$\gamma_{T,2} = \gamma_{T,1} \Delta_T. \quad (2.6)$$

The linear minimum mean square error based estimate for the D th delayed transmitted composite chip $s_1[n-D]$ in $s_1[n]$ can be expressed as $$\hat{s}_1[n-D] = w_{LMMSE,1}{}^H \cdot r[n],$$

$$w_{LMMSE,1} = (H_1 H_1^H + p H_2 H_2^H + \sigma_\eta^2 I_{2F})^{-1} H_1 \delta_D. \quad (2.7)$$

The estimate for the D th delayed transmitted composite chip $s_2[n-D]$ in $s_2[n]$ can be expressed as $$\hat{s}_2[n-D] = w_{LMMSE,2}^H \cdot r[n],$$

$$w_{LMMSE,2} = (H_1 H_1^H + p H_2 H_2^H + \sigma_\eta^2 I_{2F})^{-1} H_2 p \delta_D. \quad (2.8)$$

As shown in equations (2.7) and (2.8), the linear minimum mean square error estimates can rely on information about the channel impulse responses, noise variances with respect to two receive antennas, and the transmit power p of the second transmit antenna.

The channel estimates assuming pilot signal power of 1 are a scaled version of the true channel impulse responses, i.e., $\hat{h}_{j,i} = \sqrt{\gamma_{T,i}} h_{j,i} + n_{j,i,CIR}$. Therefore the minimum mean square error (MMSE) coefficients shown in equations (2.7) and (2.8) using the channel impulse response estimates become $$w_{LMMSE,1} = \left(\frac{1}{\gamma_{T,1}} \hat{H}_1 \hat{H}_1^H + \left(\frac{p}{\gamma_{T,2}}\right) \hat{H}_2 \hat{H}_2^H + \sigma_\eta^2 I_{2F}\right)^{-1} \left(\frac{1}{\sqrt{\gamma_{T,1}}}\right) \hat{H}_1 \delta_D \quad (2.9)$$

$$= \left(\frac{1}{\gamma_{T,1}} \hat{H}_1 \hat{H}_1^H + \frac{1}{\beta} \hat{H}_2 \hat{H}_2^H + \sigma_\eta^2 I_{2F}\right)^{-1} \left(\frac{1}{\sqrt{\gamma_{T,1}}}\right) \hat{H}_1 \delta_D$$

where $$\beta = \frac{\gamma_{T,2}}{p} = \frac{\gamma_{T,1} \Delta_T}{p}$$

and $$w_{LMMSE,2} = \left(\begin{array}{c} \frac{1}{\gamma_{T,1}} \hat{H}_1 \hat{H}_1^H + \\ \left(\frac{p}{\gamma_{T,2}}\right) \hat{H}_2 \hat{H}_2^H + \sigma_\eta^2 I_{2F} \end{array}\right)^{-1} \left(\frac{1}{\sqrt{\gamma_{T,2}}}\right) \hat{H}_2 p \delta_D \quad (2.10)$$

$$= \left(\frac{1}{\gamma_{T,1}} \hat{H}_1 \hat{H}_1^H + \frac{1}{\beta} \hat{H}_2 \hat{H}_2^H + \sigma_\eta^2 I_{2F}\right)^{-1} \left(\frac{1}{\sqrt{\gamma_{T,1} \Delta_T}}\right) \hat{H}_2 p \delta_D$$

The expressions, $$\frac{1}{\gamma_{T,1}}$$

and $$\frac{1}{\beta},$$

in equations (2.9) and (2.10) can be referred to as scaling factors. As shown in equations (2.9) and (2.10), in addition to the channel impulse response estimate $\hat{h}_{j,i}$ and the noise variance estimate $\sigma_\eta^2$, the linear minimum mean square error multiple-input multiple-output receiver also needs the estimates of primary common pilot channel power $\gamma_{T,1}$ and transmit power p of the second transmit antenna, and the power ratio $\beta$.

Certain embodiments of the present invention provide a method to estimate the noise variance $\sigma_\eta^2$, pilot power $\gamma_{T,1}$, power ratio $\beta$ and power value p, and apply these estimated parameters to calculate the proper linear minimum mean square error coefficients.

Due to the dependencies of $\gamma_{T,1}$, p and $\beta$ shown in equation (2.9), p can be obtained from $\gamma_{T,1}$ and $\beta$ as follows $$p = \frac{\gamma_{T,2}}{\beta} = \frac{\gamma_{T,1} \Delta_T}{\beta} \quad (4.1)$$

It should also be noted that $\beta$ can be expressed as $$\beta = \frac{\gamma_{T,2}}{\gamma_{T,2} + \gamma_D} = \frac{\gamma_{T,1} \Delta_T}{\gamma_{T,1} \Delta_T + \gamma_{T,1} \Delta_D} = \frac{\Delta_T}{\Delta_T + \Delta_D}. \quad (4.2)$$

Since high layer radio resource control (RRC) signaling provides the secondary common pilot channel power offset $\Delta_T$ and HS-PDSCH power offset $\Delta_D$ relative to the primary common pilot channel power, as such, power ratio $\beta$ can be calculated based on the high layer signaling information.

Based on signal model equation (2.1), the receive signal covariance matrix can be constructed as follows $$C_r = \frac{1}{\gamma_{T,1}} \hat{H}_1 \hat{H}_1^H + \left(\frac{1}{\beta}\right) \hat{H}_2 \hat{H}_2^H + \sigma_\eta^2 I_{2F} \quad (4.3)$$

$$= \frac{1}{\gamma_{T,1}} \hat{H}_1 \hat{H}_1^H + \left(\frac{\Delta_T + \Delta_D}{\Delta_T}\right) \hat{H}_2 \hat{H}_2^H + \sigma_\eta^2 I_{2F}.$$

Alternatively, the receive signal covariance matrix can be estimated directly from the receive sample covariance matrix. Let $\hat{C}_r$ denote the receive sample covariance matrix. Then $\gamma_{T,1}$ and $\sigma_{n_i}^2$ can be jointly estimated as follows $$(\gamma_{T,1}, \sigma_\eta^2) = \arg\min_{\gamma_{T,1}, \sigma_\eta^2} \|\hat{C}_r - C_r\|_F^2 \quad (4.4)$$

It is also noted that $\sigma_\eta^2$ only has contribution to the diagonal of the covariance matrix, therefore, the estimates of $\gamma_{T,1}$ and $\sigma_\eta^2$ can be decoupled. For example, $\gamma_{T,1}$ can be estimated by considering the off-diagonal elements of the difference matrix $\hat{C}_r - C_r$. Then $\sigma_\eta^2$ can be further estimated based on the known estimate of $\gamma_{T,1}$ and the diagonal of the difference matrix $\hat{C}_r - C_r$.

The covariance matrices $\hat{C}_r$ and $C_r$ matrices may be highly structured, i.e., Hermitian and block Toeplitz matrices. The non-zero block of elements of $\hat{C}_r$ can be reformulated as a vector x. The vector $\bar{x}$ can then be obtained by removing the diagonal elements of $\hat{C}_r$ from vector x. In a similar manner, vectors $y_1$ and $y_2$ can be created from matrix $\hat{H}_1 \hat{H}_1^H$ and $\hat{H}_2 \hat{H}_2^H$, respectively. In addition, $\bar{y}_1$ and $\bar{y}_2$ can be defined from $y_1$ and $y_2$. The estimation of parameter $\gamma_{T,1}$ from equation (4.4) can be simplified in the following expression"

$$\gamma_{T,1} = \arg\min_{\gamma_{T,1}} \left\| \bar{x} - \frac{1}{\gamma_{T,1}} \bar{y}_1 - \frac{1}{\beta} \bar{y}_2 \right\|_F^2. \quad (4.5)$$

From equation (4.5), with the knowledge of $\beta$ based on equation (4.2), $\gamma_{T,1}$ can be estimated by a least-squared algorithm as follows $$\hat{\gamma}_{T,1} = \text{MIN}\left\{1, \frac{\bar{y}_1^T \bar{y}_1}{\bar{y}_1^T\left(\bar{x} - \frac{1}{\beta}\bar{y}_2\right)}\right\}. \quad (4.6)$$

Furthermore, the following expressions can be defined:

$$\bar{H}_1 = \frac{1}{\sqrt{\gamma_{T,1}}} \hat{H}_1 \quad (4.7)$$

$$\bar{H}_2 = \frac{1}{\sqrt{\beta}} \hat{H}_2.$$

Then the linear minimum mean square error coefficients in equations (2.9) and (2.10) can be expressed as $$w_{LMMSE,1} = (\bar{H}_1\bar{H}_1^H + \bar{H}_2\bar{H}_2^H + \sigma_\eta^2 I_{2F})^{-1}\bar{H}_1\delta_D \quad (4.8)$$

and $$w_{LMMSE,2} = (\bar{H}_1\bar{H}_1^H + \bar{H}_2\bar{H}_2^H + \sigma_\eta^2 I_{2F})^{-1}\bar{H}_2\delta_D\sqrt{p} \quad (4.9)$$

where $\delta_D \in R^{F+L-2}$.

The linear minimum mean square error coefficients calculated in equations (4.8) and (4.9) can be employed as equalizer filter coefficients. Thus, the receive signal samples can be filtered by the equalizer filter so that the outputs of the equalizer filter are the estimates of the transmit chip signals. In particular, the outputs of the equalizer filter with the coefficients of equation (4.8) can serve as the estimates of the transmit chips from the first transmit antenna, and the outputs of the equalizer filter with the coefficients of equation (4.9) can serve as the estimates of the transmit chips from the second transmit antenna. Due to the variation of the radio channels, the equalizer filter coefficients can be updated periodically in order to capture the change of channels. The update period can also be referred to as a processing period. As such, a method according to certain embodiments of the present invention can be performed in every processing period, so that equalizer filter coefficients can be updated accordingly.

Both estimates of two transmit chip signals can be further processed by a de-spreader to obtain the estimates of the transmit symbol signals. The transmit symbol signals of two transmit antenna can then be combined by the multiple-input multiple-output decoder. The outputs of the multiple-input multiple-output decoder can serve as soft values of a transmit bit sequence, and can be further fed to a hybrid automatic repeat request (HARQ) processing unit. The transmit information bits can be recovered by the HARQ processing unit.

A method according to certain embodiments can be implemented in a receiver as shown in FIG. 1. More particularly, FIG. 1 illustrates pilot power and noise variance estimation used in a linear minimum mean square error receiver for imbalanced transmission signal.

As shown in FIG. 1, a signal composed of two signals, S1($t$) and S2($t$), can be sent from a transmitter (TX) that has a pair of antennas. After passing through a communication medium (such as air), a receiver can receive the signal at two receive antennas, as r1($t$) and rt(2). The receive signals from two receive branches can be processed to obtain the channel impulse response estimates (in the channel estimator) and receive sample covariance estimates (in the receive sample covariance estimator), which can then be used for pilot power and noise variance estimation according to equation (4.4). By virtue of the known power offset parameter signaled from a higher layer, the parameter β can be further calculated as per equation (4.2). Beyond simply being used to provide the estimated parameters, the channel impulse response estimates can be scaled as in equations (4.5), (4.6), and (4.7). Finally, the linear minimum mean square error based chip equalizer filter taps can be obtained according to equations (4.8) and (4.9).

Compared to a conventional linear minimum mean square error solution for a balanced transmission signal, a method according to certain embodiments of the present invention can employ prescaling for channel impulse responses and postscaling for taps based on the estimated parameters. As such, it may be possible to configure the method for both the balanced and imbalanced case.

Figure 2:
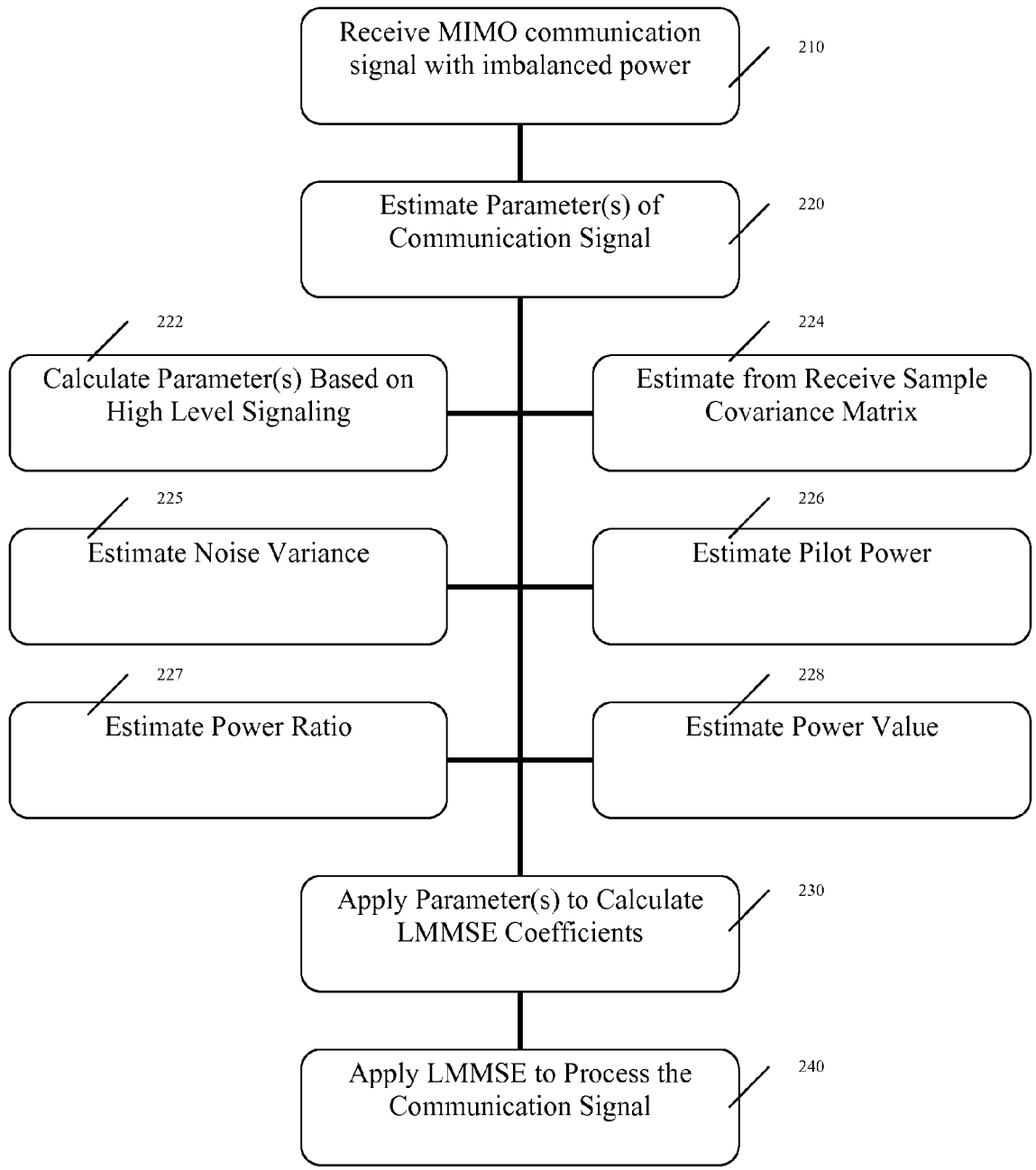
FIG. 2 illustrates a method according to certain embodiments of the present invention.

FIG. 2 illustrates a method according to certain embodiments of the present invention. As shown in FIG. 2, a method can include, at 210, receiving a multiple-input multiple-output system communication signal comprising at least one primary signal at a first power level from a first antenna and a secondary signal at a second power level different from the first power level from a second antenna.

The method can also include, at 220, estimating at least one parameter of the communication signal. The estimating can include, at 222, calculating the at least one parameter based on higher layer signaling. The estimating can also include, at 224, estimating from a receive sample covariance matrix.

The estimating can further include, at 225, estimating the noise variance. The estimating can additionally include, at 226, estimating pilot power. The estimating can also include, at 227, estimating power ratio. The estimating can further include, at 228, estimating power value.

The estimating can additionally include estimating the linear minimum mean square error coefficients as $w_{LMMSE,1} = (\bar{H}_1\bar{H}_1^H + \bar{H}_2\bar{H}_2^H + \sigma_\eta^2 I_{2F})^{-1}\bar{H}_1\delta_D$ and $w_{LMMSE,2} = (\bar{H}_1\bar{H}_1^H + \bar{H}_2\bar{H}_2^H + \sigma_\eta^2 I_{2F})^{-1}\bar{H}_2\delta_D\sqrt{p}$ where $\delta_D \in R^{F+L-2}$, F is the length of the receiver equalizer filter operating at a sampling rate of two times chip rate, L is the length of the channel impulse response (CIR) at the resolution of half chip, $H_{j,i}$ is the channel matrix with respect to the channel between i th transmit antenna and j th receive antenna, p is the transmit power of the second transmit antenna, $\sigma_\eta^2$ expresses the noise variance, and $I_{2F}$ is an identity matrix. This has not been explicitly indicated in FIG. 2, although it can be seen in FIG. 1.

As shown in FIG. 2, the method can further include, at 230, applying the at least one parameter as estimated to calculate linear minimum mean square error coefficients. The method can additionally include, at 240, applying the linear minimum mean square error coefficients to process the communication signal.

Figure 3:
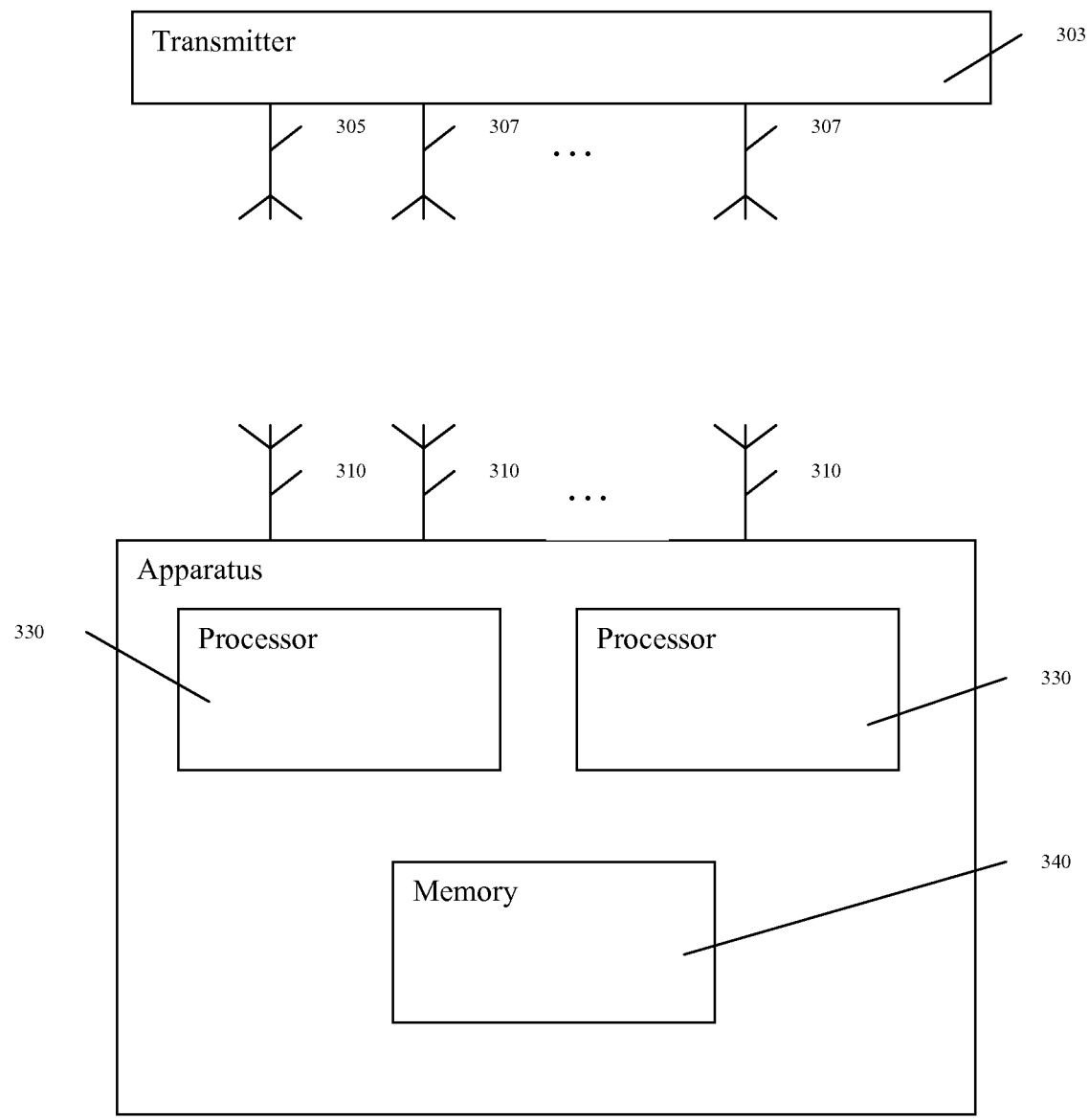
FIG. 3 illustrates another system according to certain embodiments of the present invention.

FIG. 3 illustrates a system according to certain embodiments of the present invention. FIG. 3 illustrates a plurality of antennas 310 provided on an apparatus 320, which may be a user equipment, such as a mobile telephone, personal digital assistant, or personal computer. The antennas 310 are shown as three antennas, but more or fewer antennas are also permitted. In certain embodiments, the antennas 310 may be formed in a combined way, although they are shown as individual, separate antenna elements. There is no requirement that the apparatus 320 be equipped with antennas 310 at all times. For example, the apparatus 320 may be a subcomponent of a mobile telephone, and consequently may not itself have any antennas, although it may be equipped to receive signals from the antennas 310.

The apparatus 320 may include one or more processors 330. Two processors 330 are shown, although more processors or fewer processors can be employed. The processors 330 may be dedicated for use with this apparatus 320 or may be shared between this apparatus 320 and other devices.

The apparatus 320 may also include one or memory 340. Although one memory 340 is shown, multiple memories are permitted. The memory 340 may be any suitable storage medium, such a non-transitory medium. The storage medium may be, for example, random access memory (RAM) or read only memory (ROM). The storage medium may be on-board with a same chip as the processor(s) 330 or may be separate.

The memory 340 may be loaded with computer instructions that are configured to be executed in hardware. The memory 340 and the computer instructions can be configured to, with the processor(s) 330, cause the apparatus 320 to perform a process. The process may be one of the processes discussed above, such as one of the processes shown in FIGS. 1 and 2.

The antennas 310 may be receiving a communication signal from a transmitter 303. The transmitter 303 may have multiple antennas, including a primary antenna 305 and a variety of secondary antennas 307.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
receiving a multiple-input multiple-output system communication signal comprising at least one primary signal at a first power level from a first antenna and a secondary signal at a second power level different from the first power level from a second antenna;
estimating the first power level of the communication signal from a receive sample covariance matrix by taking into account the difference between the first power level and the second power level;
applying the first power level as estimated to calculate linear minimum mean square error coefficients; and
applying the linear minimum mean square error coefficients to process the communication signal.

2. The method of claim 1, wherein the estimating comprises calculating the first power level based on higher layer signaling.

3. The method of claim 1, further comprising:
estimating the noise variance from the received sample covariance matrix by taking into account the difference between the first power level and the second power level.

4. The method of claim 1, wherein the estimating the first power level comprises estimating pilot power.

5. A method, comprising:
receiving a multiple-input multiple-output system communication signal comprising at least one primary signal at a first power level from a first antenna and a secondary signal at a second power level different from the first power level from a second antenna;
estimating at least one parameter of the communication signal;
applying the at least one parameter as estimated to calculate linear minimum mean square error coefficients; and
applying the linear minimum mean square error coefficients to process the communication signal,
wherein the estimating comprises estimating the linear minimum mean square error as $$w_{LMMSE,1} = (\bar{H}_1\bar{H}_1^H + \bar{H}_2\bar{H}_2^H + \sigma_n^2 I_{2F})^{-1}\bar{H}_1\delta_D$$

and $$w_{LMMSE,2} = (\bar{H}_1\bar{H}_1^H + \bar{H}_2\bar{H}_2^H + \sigma_n^2 I_{2F})^{-1}\bar{H}_2\delta_D\sqrt{p}$$

where $\delta_D \in R^{F+L-2}$,
$\delta_D$ stands for unit vector, R stand for real value
F is the length of the receiver equalizer filter operating at a sampling rate of two times chip rate,
L is the length of the channel impulse response (CIR) at the resolution of half chip,
$H_{j,i}$ is the channel matrix with respect to the channel between i th transmit antenna and j th receive antenna,
p is the transmit power of the second transmit antenna,
$\sigma_n^2$ expresses a noise variance, and
$I_{2F}$ is an identity matrix.

6. An apparatus, comprising:
at least one processor; and
at least one memory including computer program instructions,
wherein the at least one memory and computer program instructions are configured to, with the at least one processor, cause the apparatus at least to
estimate a first power level of a received multiple-input multiple-output system communication signal comprising at least one primary signal at the first power level from a first antenna and a secondary signal at a second power level different from the first power level from a second antenna, wherein the estimate is obtained from a receive sample covariance matrix by taking into account the difference between the first power level and the second power level;
apply the first power level as estimated to calculate linear minimum mean square error coefficients; and
apply the linear minimum mean square error coefficients to process the communication signal.

7. The apparatus of claim 6, wherein the estimating comprises calculating the first power level based on higher layer signaling.

8. The apparatus of claim 6, wherein the at least one memory and computer program instructions are configured to, with the at least one processor, cause the apparatus at least to estimate the noise variance from the received sample covariance matrix by taking into account the difference between the first power level and the second power level.

9. The apparatus of claim 6, wherein the estimating the first power level comprises estimating pilot power.

10. An apparatus, comprising:
at least one processor; and
at least one memory including computer program instructions,
wherein the at least one memory and computer program instructions are configured to, with the at least one processor, cause the apparatus at least to
estimate at least one parameter of a received multiple-input multiple-output system communication signal comprising at least one primary signal at a first power level from a first antenna and a secondary signal at a second power level different from the first power level from a second antenna;
apply the at least one parameter as estimated to calculate linear minimum mean square error coefficients; and apply the linear minimum mean square error coefficients to process the communication signal, wherein the estimating comprises estimating the linear minimum mean square error as $$w_{LMMSE,1}=(\bar{H}_1\bar{H}_1^H+\bar{H}_2\bar{H}_2^H+\sigma_\eta^2 I_{2F})^{-1}\bar{H}_1\delta_D$$

and $$w_{LMMSE,2}=(\bar{H}_1\bar{H}_1^H+\bar{H}_2\bar{H}_2^H+\sigma_\eta^2 I_{2F})^{-1}\bar{H}_2\delta_D\sqrt{p}$$

where $\delta_D \in R^{F+L-2}$, $\delta_D$ stands for unit vector, R stand for real value F is the length of the receiver equalizer filter operating at a sampling rate of two times chip rate, L is the length of the channel impulse response (CIR) at the resolution of half chip, $H_{j,i}$ is the channel matrix with respect to the channel between i th transmit antenna and j th receive antenna, p is the transmit power of the second transmit antenna, $\sigma_\eta^2$ expresses a variance, and $I_{2F}$ is an identity matrix.

11. A non-transitory computer readable medium encoded with instructions that, when executed in hardware, perform a process, the process comprising:

receiving a multiple-input multiple-output system communication signal comprising at least one primary signal at a first power level from a first antenna and a secondary signal at a second power level different from the first power level from a second antenna;

estimating the first power level of the communication signal from a receive sample covariance matrix by taking into account the difference between the first power level and the second power level;

applying the first power level as estimated to calculate linear minimum mean square error coefficients; and applying the linear minimum mean square error coefficients to process the communication signal.

12. The non-transitory computer readable medium of claim 11, wherein the estimating comprises calculating the first power level based on higher layer signaling.

13. A non-transitory computer readable medium encoded with instructions that, when executed in hardware, perform a process, the process comprising:

receiving a multiple-input multiple-output system communication signal comprising at least one primary signal at a first power level from a first antenna and a secondary signal at a second power level different from the first power level from a second antenna;

estimating at least one parameter of the communication signal;

applying the at least one parameter as estimated to calculate linear minimum mean square error coefficients; and applying the linear minimum mean square error coefficients to process the communication signal, wherein the estimating comprises estimating the linear minimum mean square error as $$w_{LMMSE,1}=(\bar{H}_1\bar{H}_1^H+\bar{H}_2\bar{H}_2^H+\sigma_\eta^2 I_{2F})^{-1}\bar{H}_1\delta_D$$

and $$w_{LMMSE,2}=(\bar{H}_1\bar{H}_1^H+\bar{H}_2\bar{H}_2^H+\sigma_\eta^2 I_{2F})^{-1}\bar{H}_2\delta_D\sqrt{p}$$

where $\delta_D \in R^{F+L-2}$, $\delta_D$ stands for unit vector, R stand for real value F is the length of the receiver equalizer filter operating at a sampling rate of two times chip rate, L is the length of the channel impulse response (CIR) at the resolution of half chip, $H_{j,i}$ is the channel matrix with respect to the channel between i th transmit antenna and j th receive antenna, p is the transmit power of the second transmit antenna, $\sigma_\eta^2$ expresses the noise variance, and $I_{2F}$ is an identity matrix.

* * * * *